June 6, 1961 D. M. LIPKIN 2,987,667

TRANSVERSE MAGNETIC AMPLIFIER

Filed March 17, 1955 3 Sheets-Sheet 1

INVENTOR.
DANIEL M. LIPKIN

BY Charles C. English

AGENT

INVENTOR.
DANIEL M. LIPKIN
BY
Charles E. English
AGENT

June 6, 1961 D. M. LIPKIN 2,987,667

TRANSVERSE MAGNETIC AMPLIFIER

Filed March 17, 1955 3 Sheets-Sheet 3

INVENTOR.
DANIEL M. LIPKIN
BY
Charles C. Enfield
AGENT

United States Patent Office 2,987,667

Patented June 6, 1961

2,987,667

TRANSVERSE MAGNETIC AMPLIFIER

Daniel M. Lipkin, Philadelphia, Pa., assignor to Sperry Rand Corporation, a corporation of Delaware Filed Mar. 17, 1955, Ser. No. 494,903
7 Claims. (Cl. 323—89)

The present invention concerns a novel primary type of magnetic amplifier utilizing transverse magnetization and featuring zero or negligible hysteresis losses.

It is an object of the invention to provide a magnetic amplifier which operates on controllable mutual inductance produced by suitable use of transverse magnetizing fields applied to a ferro-magnetic body.

It is an object of the invention to operate a magnetic amplifier in a condition in which any changes of magnetization of the core will occur without appreciable energy storage or irreversible loss as heat in the core material.

It is an object of the invention to produce controllable effective mutual inductance in two windings positioned on a core so as to have zero mutual inductance under certain initial conditions and to experience controlled effective mutual inductance upon the rotation or oscillation of the saturated magnetization vector of the core material.

Among the magnetic materials that may be used in this invention are those having a substantially rectangular hysteresis characteristic.

The basic considerations concerning transverse devices comprising the present invention may be formulated as follows:

(1) Transverse fields are in general applied to a core of ferromagnetic material simultaneously. It may be noted that the B-H relationships are quantitatively unknown except under the conditions to be described below.

(2) It is possible by means of the invention to obtain quantitatively predictable B-H relationships in transverse core structures, consisting in the resultant B vector being a simple mathematical function of the resultant H vector.

(3) The above is accomplished by observing strictly the condition that the scalar magnitude of the vector resultant magnetizing force be kept above a predeterminable level characteristic of the magnetic material.

A. When the above condition is met, the vector flux density B is substantially given by the vector equation:

$$(1)\qquad \vec{B}=\frac{Bs\vec{H}}{h}$$

where $Bs$ is the saturation flux density magnitude for the material; $\vec{H}$ is the resultant magnetizing force vector in the material; and $h$ is the scalar magnitude of $\vec{H}$.

The above equation states that $\vec{B}$ is in the same direction as $\vec{H}$ and has fixed magnitude $Bs$. This relationship is justified and occurs when the above condition is satisfied.

B. When Equation 1 is satisfied, the core itself does not absorb or store energy even temporarily, but merely serves to transfer energy between the sources of the transverse fields, yielding loss-less operation.

(4) Condition 3 above is met by having at least two transverse fields satisfying the condition:

$$(2)\qquad h \geqslant hp$$

where $hp$ is the predeterminable level referred to in 3 above.

(5) In a practical embodiment, a transverse magnetic structure, constructed in accordance with the foregoing considerations, would comprise a body of magnetic material having magnetizing means associated therewith and adapted to impress mutually orthogonal fields on the said body. An output effect may be produced from such a transverse structure by varying the magnitude of at least one of the transverse fields and, so long as the condition represented by Equation 2 is satisfied, the operation of the device will be substantially loss-less.

(6) The predeterminable level $hp$ referred to above may be taken to be that value of magnetizing field larger than the value at which the specific rotational hysterisis loss for the material peaks (see FIGURE 1B) and for which the specific rotational hysteresis loss is appreciably less than said maximum rotational hysteresis loss.

In the drawings, like numerals refer to like parts throughout.

A saturable reactor with transverse magnetization comprises a device having a magnetic core subjected simultaneously to a plurality of variable, displaced fields which saturate the core material and produce an oscillation or rotation of the saturated magnetization vector of the material which follows to a greater or less degree the oscillation or rotation of the resultant field vector producing saturation, depending, at least to some extent, upon the value of the field above that required to produce complete saturation. As the scalar value of the magnetizing field increases above that required for complete saturation, experiment shows that the saturated flux vector comes increasingly under the dominance of the resultant magnetizing field, and although the saturated flux changes little in value, it becomes to a greater and greater degree aligned with the resultant field until the two representative vectors may be thought of as locked together.

In the region beyond the maximum rotational loss, an increase in applied field tends to bring the magnetic field closer to saturation. Under a condition of substantial saturation, the field and flux vectors have substantially the same direction, and, as the field vector rotates, the flux vector tends to rotate with it continuing in the same direction as the field vector. At lesser values of the field, the field and flux vectors have somewhat different directions and the angle between them may vary. This characteristic of the substantially saturated flux vector having substantially the same direction as the field vector is termed "clamping action between the flux and field vectors B and H" in FIG. 1 and similarly elsewhere in this specification and in certain claims.

In general, core materials which saturate rapidly, such as those having rectangular hysteresis loops, are preferred. Such materials require in general smaller field values to achieve the desired result and are therefore more efficient.

Figure 1A:
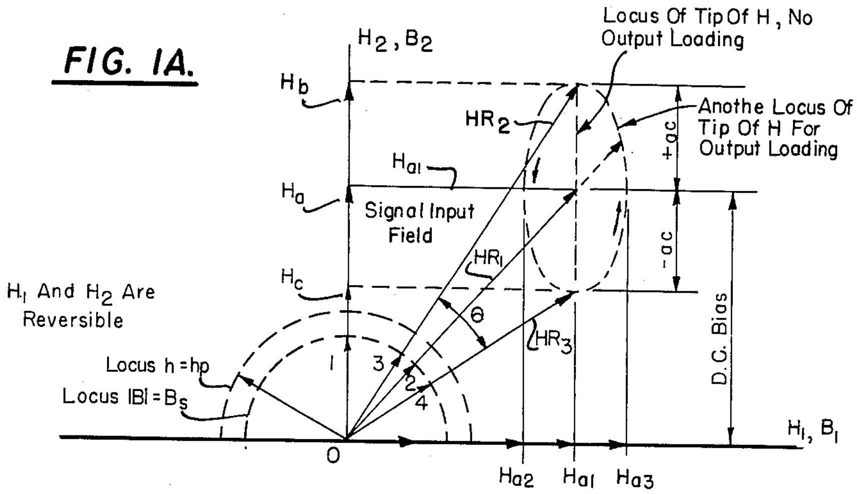
FIGURE 1A is a magnetization vector diagram showing the magnetic condition of core material during operation of the invention.
Figure 1B:
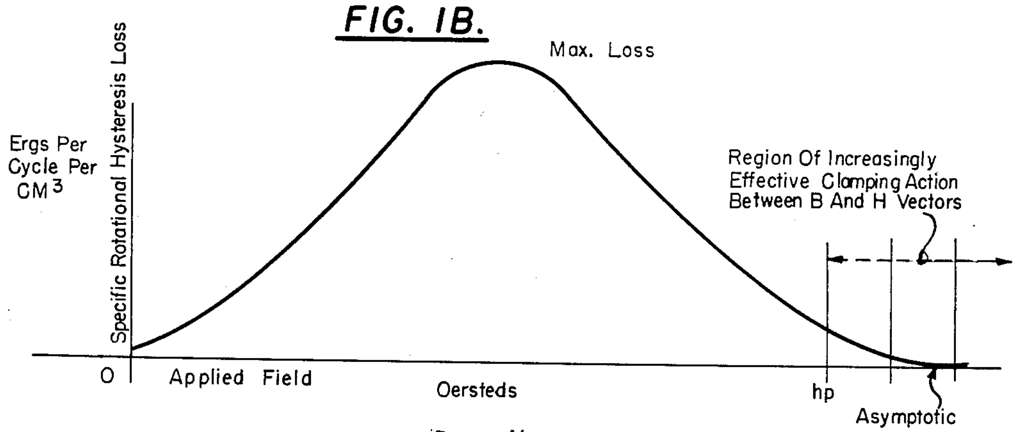
FIGURE 1B is an energy loss diagram for core material during various conditions of operation.
Figure 1C:
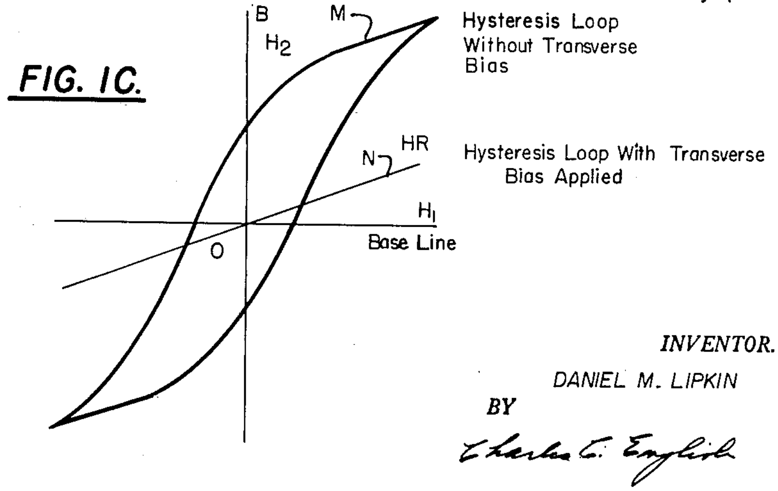
FIGURE 1C is a schematic diagram showing a transverse hysteresis loop for one type of magnetic material that may be used in the invention with and without transverse bias applied.

In FIGURE 1C are shown two hysteresis loops M and N, for the same material. Loop M has substantial area. Loop N, however, appears as a straight line rotated clockwise about the origin O. The line of N is an oscilloscope picture of the hysteresis loop of the same material when subjected to a transverse field $H_2$ in addition to the field $H_1$ which produced loop M. Line N is found empirically to be tilted more or less depending upon the value of the transverse field. To produce the effect described, neither $H_1$ nor $H_2$ alone need saturate the magnetic core, but their resultant must, and the effect is the more pronounced the more the resultant magnetizing field exceeds that required for complete saturation of the particular core material.

Referring to FIGURE 1A, several modes of operation will appear.

(1) Where $H_1=0$, it will be seen that $\vec{H}$ oscillates between $H_c$ and $H_b$ when radio frequency current is applied; $\vec{B}$ remains fixed in vertical direction, vector 1, so no change occurs in $B_1$.

(2) Where signal current produces a magnetizing field of magnitude $H_{a_1}$.

A. *No output loading*

$\vec{H}$ assumes position $H_{R_1}$ and $\vec{B}$ assumes the position shown by vector 2, before radio frequency power is applied. On application of radio frequency power, $\vec{H}$ oscillates through the angle $\theta$, between limits shown by the vectors $H_{R_2}$ and $H_{R_3}$, its tip following the locus shown by the vertical dotted line. At the same time, the $\vec{B}$ vector, maintaining the same direction as $\vec{H}$ but the fixed scalar magnitude $B_S$, as provided for earlier, oscillates between the vector positions 3 and 4. The component $B_1$ of $\vec{B}$, shown as horizontal in FIGURE 1A, undergoes an oscillation in magnitude, which induces voltage at the radio frequency in the output coil. This output voltage produces no output current in the present illustration because of the lack of a load. The same oscillation of $B_1$ also induces radio frequency voltage in the input coil, but this produces no radio frequency component in the signal circuit because of decoupling means, as exemplified by the coil L50 of FIGURE 5. These absences of radio frequency current in the signal and output windings permit $H_1$ to remain constant at the signal-produced value $H_{a_1}$, accounting for the $\vec{H}$-vector locus under the condition of no output loading.

B. *Output loading*

The output coil will now carry current at the output frequency, introducing a radio frequency component into $H_1$, so that the tip of the resultant $\vec{H}$ vector will traverse a closed loop, such as shown in FIGURE 1A. The exchange of energy between the transverse magnetic fields when the $\vec{H}$ vector traces out such a loop is such as to transfer a net positive amount of energy from the radio frequency current source to the output circuit per cycle.

As shown in FIGURE 1B, the hysteresis loss in a magnetic material increases to a maximum where the area of the curve or loop M of FIGURE 1C may be employed as an ordinate of the envelope curve in FIGURE 1B. As the resultant field continues to increase, the region of vanishing rotational hysteresis loss is reached and any changes of magnetization of the core will take place without storage or irreversible loss of energy in the core or shell. Just where the region of substantially diminishing rotational loss occurs will vary greatly as the characteristic curve M departs from a rectangle which gives the steepest slope for the curve of FIGURE 1B. This curve is not necessarily symmetrical, but starts near the origin, passes through a more or less critical maximum and is asymptotic to the "X" axis as field H increases. The region we are here concerned with lies to the right of this maximum. Of course, the power required to produce and maintain fields of such magnitude is itself a limiting factor. In general, where the current producing field $H_{A1}$ in FIGURE 1A may be thought of as a signal input or pulse, it should have a time duration at least five times that of the alternating current added to the D.C. to meet the requirements of good design.

Figure 2:
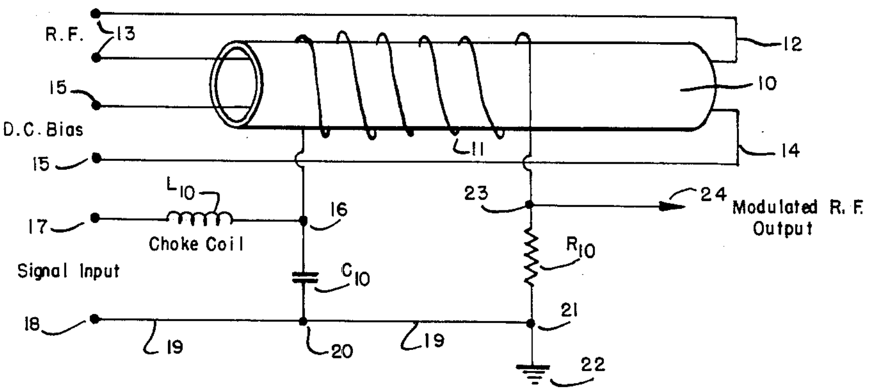
FIGURE 2 is a schematic diagram of one form of transverse magnetic amplifier according to the invention.

In FIGURE 2 a long slender ferro-magnetic tube 10 is provided with a single input-output winding 11 wound around the outside of tube or cylinder 10 and covering most of the length thereof. Cylindrical core 10 is also provided with a winding 12 connected to a radio frequency source at 13 and a bias winding 14 connected to a source of direct current at 15. One end of coil 11 is connected at junction 16 with choke coil L10 and radio frequency by-pass condenser C10. The other end of coil L10 is connected to signal input terminal 17. The other signal input terminal 18 is connected by wire 19 to the other side of condenser C10 at 20 and to junction 21. Junction 21 is connected to one side of output load resistor R10 and is grounded at 22. The other side of resistor R10 is connected at junction 23 to the other end of input-output winding 11 and to modulated radio frequency output terminal 24.

A direct current D.C. of sufficient amplitude to maintain the magnetic material of core 10 saturated and to produce sufficient additional field to lock the magnetization vector $B_S$ in phase with the field vector $H_A$ is applied to terminals 15 as shown in FIGURE 1A. An alternating current (A.C.), also called radio frequency current, is applied to terminals 13 of winding 12 from a source (not shown) to superimpose an A.C. ripple on the D.C. bias field, causing $H_A$ to vary between the values $H_B$ and $H_C$. $B_S$ remains substantially constant in magnitude and there is no change of direction.

If now a signal of suitable amplitude is applied to input terminals 17 and 18, it will establish a mutual coupling between coil 11 and the varying transverse field $H_B$—$H_C$. The signal pulse provides an orthogonal field $H_{A_1}$ which combines with field vector $H_A$ to produce resultant $H_{R_1}$. As saturated magnetization vector $B_s$ is of substantially maximum and constant length and locked in phase with H by the magnitude of the D.C. bias, it rotates clockwise around its dotted locus circle in FIGURE 1A. As $H_{R_1}$ assumes the successive values $H_{R_2}$ and $H_{R_3}$, during the time period of the signal pulse, $B_s$ oscillates through the angle $\theta$ and induces a voltage in coil 11 which appears as a modulated radio frequency output at terminal 24. It will be seen that the device of FIGURE 2 produces an output signal in response to an input and so meets the definition of a non-complementing magnetic amplifier. Inductor or choke coil L10 inhibits radio frequency waves from coupling back into the signal circuit of coil 11, as does also radio frequency by-pass condenser C10. The duration of a signal pulse is such as to form a definite modulation envelope at output terminal 24. This of course assures a sufficient number of oscillations of $B_s$ to provide ample mutual inductance between coil 11 and the transverse magnetic field. L10 and C10 provide essentially a filter circuit portion which may be replaced by equivalent circuit elements capable of producing the same or improved results.

Figure 3:
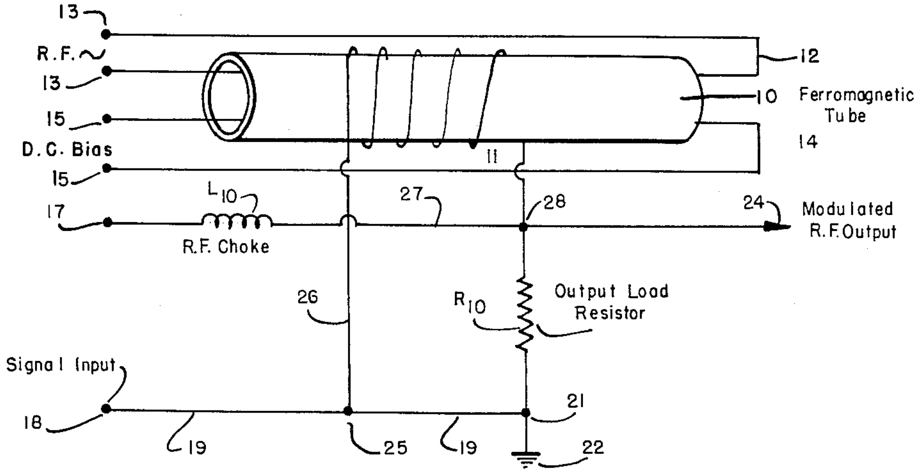
FIGURE 3 is a schematic diagram of a second form of transverse magnetic amplifier according to the invention.

FIGURE 3 shows a modified arrangement of the structure of FIGURE 2. This circuit provides a low resistance direct current return path from ground at 22, wire 19, junction 25 and wire 26 to one end of coil 11.

Figure 4:
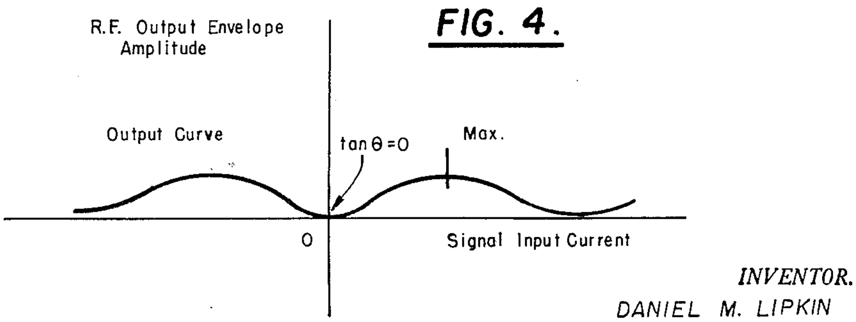
FIGURE 4 is a schematic diagram of an input curve for the transverse magnetic amplifiers of FIGURES 1 and 2.

Transverse magnetic amplifiers of the character of those illustrated in FIGURES 2 and 3 give an output signal having an envelope amplitude as shown by the curve of FIGURE 4. The curve will be seen to have the following characteristics:

(1) Symmetrical about zero input.

(2) Zero output for zero input and output in response to input corresponding to a non-complementing amplifier.

(3) Zero slope at zero input $$\tan \frac{\text{output}}{\text{input}}=0$$

(4) Output amplitude or response peaks or rises to a decided maximum value for a certain magnitude of input and then falls off gradually for greater input values.

Figure 5:
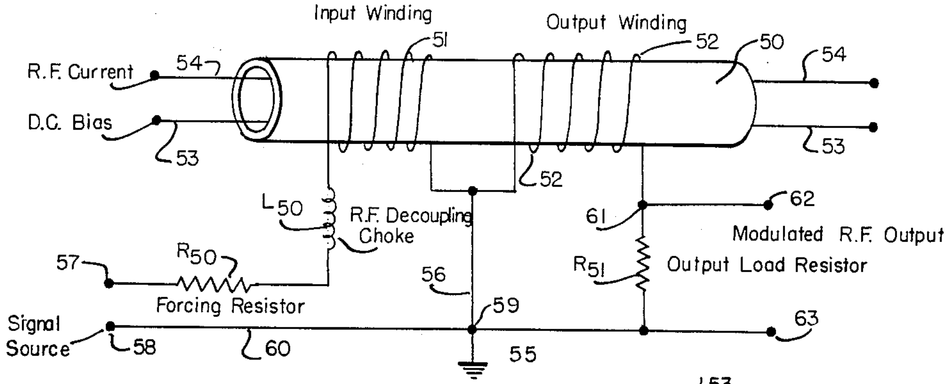
FIGURE 5 is a schematic diagram of a third magnetic amplifier according to the invention.

Figure 5 illustrates another modified form of the invention in which a long slender ferro-magnetic tube 50 is provided with two windings, input winding 51 and output winding 52, shown coiled around the outside of the tube 50. A direct current bias winding 53 serves to saturate the core material and winding 54 serves to impose a radio frequency current on the direct current to produce fields $H_A$, $H_B$ and $H_C$ as discussed in connection with FIGURE 1A. One end of input winding 51 is connected to the adjacent end of output winding 52 and the two ends are grounded at 55 by wire 56. The other end of input winding 51 is connected through radio frequency decoupling choke coil L50 and forcing resistor R50 to one signal input terminal 57. Signal input terminal 58 is connected to junction 59 with wire 56 and ground 55 by a wire 60. The other end of output winding 52 is connected at junction 61 with one terminal of output load resistor R51 and output terminal 62. The other terminal of load resistor R51 may be connected to a second output terminal 63 or ground 55 may be employed for that purpose if desired.

It will be seen that (*a*) both the windings 51 and 52 can be wound the entire length of tube 50; (*b*) one can wind only the input winding 51 the entire length of tube 50; or (*c*) neither winding 51 nor 52 need be wound the entire length of tube 50. Form *a* will be simpler for mathematical analysis because it is the most symmetrical of the three possibilities. As discussed above, there is no radio frequency pick up in output winding 52 until signal current is applied to terminals 57, 58 and the saturated magnetization vector of core 50 is caused to oscillate. R.F. decoupling choke L50 prevents any appreciable current flow in the signal circuit, but it will increase the signal rise time and therefore must be supplemented by a larger forcing resistor R50 than would otherwise be necessary, thus limiting the possible power gain obtainable from this particular magnetic amplifier.

The operation of the transverse magnetic amplifier of FIGURE 5 is as follows:

(1) D.C. bias is established in winding 53 with a field at least as large as *hp*. Complete saturation is of course established.

(2) Radio frequency current is supplied to winding 54.

(3) Add varying input at terminals 57 and 58. For example, the input may be a pulse, and if so, its duration should be long enough to produce a satisfactory envelope, i.e. at least five cycles of radio frequency.

A. The presence of input at 57, 58 causes $\vec{B}$ to have a component linking input winding 51.

B. The radio frequency power at 54 oscillates the component of $\vec{B}$ parallel to the axis of core 50, inducing a voltage in coil 52.

(4) The oscillation or wiggles of the resultant flux vector induces a voltage in coil 51 and inductance L50 is a decoupling choke which opposes the radio frequency component of current induced in circuit 51, 56, 57 and 60.

Figures 6, 7A, 7B:
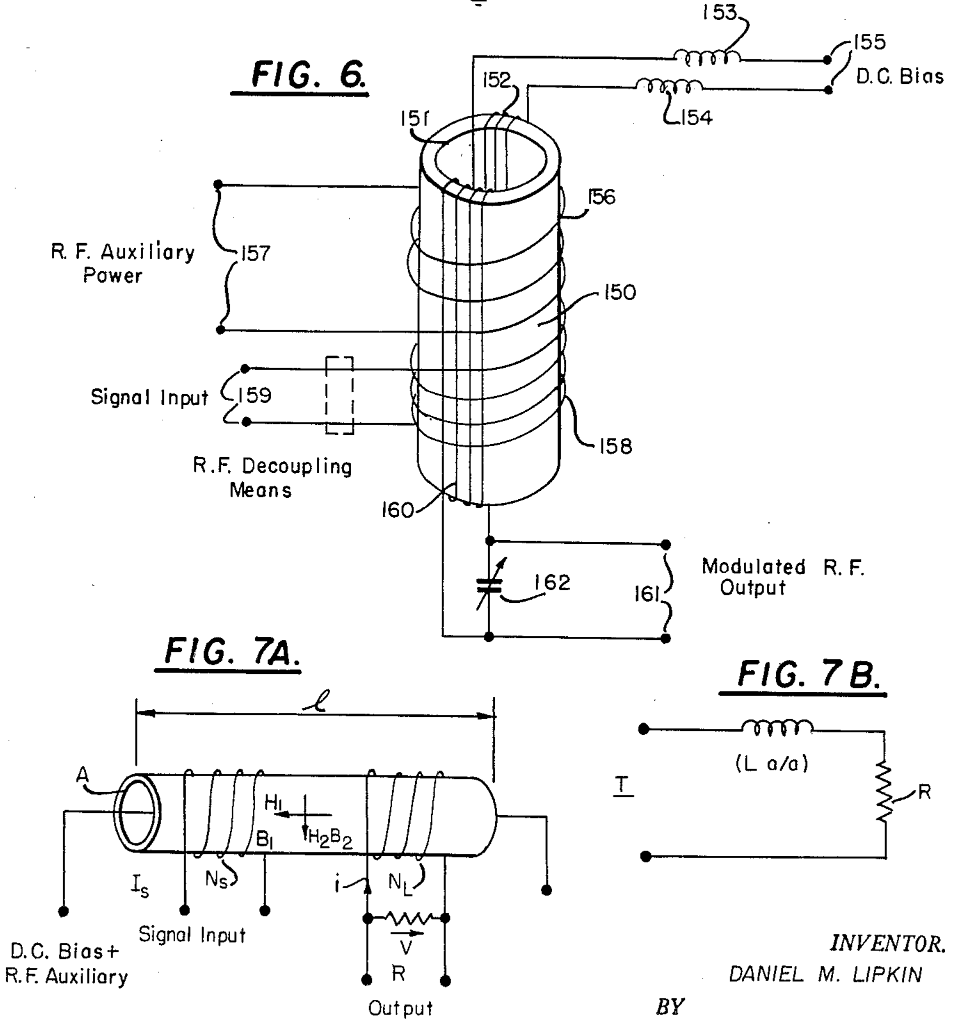
FIGURE 6 is a schematic diagram of a fifth transverse magnetic amplifier according to the invention.
FIGURE 7A is one form of transverse magnetic device selected for analysis.
FIGURE 7B is an equivalent circuit employed in the analysis of FIGURE 7A.

FIGURE 6 presents one form of tuned magnetic amplifier using transverse magnetization. A core 150 of ferromagnetic material is provided with a central channel 151 through which are threaded a D.C. bias winding 152 having large radio frequency chokes 153 and 154 in its circuit, and provided with terminals 155 for connection to a direct current bias supply. An auxiliary winding 156 is wound around the circumference of core 150 and is provided with terminals 157 for connection to a source of radio frequency power. A signal input winding 158 is also wound around the circumference of core 150 but spaced from winding 156, and is provided with terminals 159 for connection to a signal input. Radio frequency decoupling means can be inserted in winding 158 at the point indicated by the dotted rectangle, if desired. A radio frequency output winding 160 threads channel 151 and is connected to terminals 161. A variable condenser is connected across the terminals 161. The current from the D.C. bias supply connected to terminals 155 is sufficient to keep all parts of the ferrite tube or core 150 saturated and operating in the region of vanishing hysteresis. With no signal current applied at terminals 159, the output electromotive force at terminals 161 is small and occurs at the second harmonic of the radio frequency in auxiliary winding 156. Capacitor 162 is tuned only for the fundamental frequency and there is therefore no output at terminals 161. If a signal input is impressed at terminals 159, an unbalance is created which allows the output winding to pick up the fundamental of the radio frequency current flowing in winding 156; and a signal is produced at terminals 161 because condenser 162 is tuned for the fundamental frequency of the RF auxiliary power supplies to winding 156. Here again the inductive effect is produced by the oscillation of the saturated magnetization vector $B_s$ through an angle such as $\theta$ of FIGURE 1A. For this purpose, FIGURE 1A is taken as merely representative of a general condition.

ANALYSIS OF TRANSVERSE MAGNETIC AMPLIFYING DEVICES

A mathematic analysis of the above and related transverse magnetization amplifiers may take the following form:

*Case A*

Single tubular core with simple resistance loading of output winding.

In the structure of FIGURE 7*a* in which it is assumed that no current flows at radio auxiliary frequency in the signal winding, the following equations may be established:

(1) $$H_2=H_0+H_A \sin \omega t$$

(2) $$H_1=\frac{4\pi L}{10l}(N_S I_S+N_L i)$$

(3) $$V=iR=\left(-10^{-8}N_L A\frac{dB_1}{dt}\right)$$

(4) $$B_1^2+B_2^2=B_S^2$$

(5) $$B_1H_2=B_2H_1$$

Equation 1 is obtained by assuming that the bias and radio frequency auxiliary currents combine to produce $H_2$ as shown.

Let $$\left(\frac{4\pi}{10l}N_S I_S\right)=H_S$$

$$\left(\frac{4\pi}{10^4}\frac{N_L^2 A}{l}\right)=L_0$$

substituting:

(6) $$H_1=H_S-\frac{L_0}{R}\frac{dB_1}{dt}$$

(7) $$B_1=\frac{B_S H_1}{\sqrt{H_1^2+H_2^2}} \text{ or alternatively } H_1=\frac{H_2}{\sqrt{\left(\frac{B_S}{B_1}\right)^2-1}}$$

(8) $$\left(H_S-\frac{L_0}{R}\frac{dB_1}{dt}\right)\sqrt{\left(\frac{B_S}{B_1}\right)^2-1}=H_0+H_A \sin \omega t$$

Equation 8 may be solved for $B_1$ as a function of time and thereby V can be determined by substitution in Equation 3. One practical way to solve Equation 8 without employing a computer device is to assume a small radio frequency signal approximation which fortunately fits the facts in the case reasonably well.

Let $$B_1(t)=B_0+\lambda f(t) \text{ where } \lambda \ll 1$$

$$H_A=\lambda h_A$$

Substituting:

$$\left[H_S-\frac{L_0}{R}\lambda f^1(t)\right]\sqrt{B_S^2-B_0^2}\left(1-\frac{B_0}{B_S^2-B_0^2}\lambda f(t)\right)\frac{1}{B_0}\left(1-\frac{\lambda}{B_0}f(t)\right)=H_0+\lambda h_A \sin \omega t$$

$$\left[H_S-\frac{L_0}{R}\lambda f^1(t)\right]\sqrt{\left(\frac{B_S}{B_0}\right)^2-1}\left[1-\frac{\lambda f(t)B_S^2}{B_0(B_S^2-B_0^2)}\right]=H_0+\lambda h_A \sin \omega t$$

Assuming $$\frac{L_0}{R}\lambda f^1(t)\ll H_S$$

(9)

$$H_S\sqrt{\left(\frac{B_S}{B_0}\right)^2-1}\left[1-\lambda\left(\frac{L_0}{RH_S}f^1(t)+\frac{f(t)}{B_0\left(1-\left(\frac{B_0}{B_S}\right)^2\right)}\right)\right]=H+\lambda h_A \sin \omega t$$

$$H_0=H_S\sqrt{\left(\frac{B_S}{B_0}\right)^2-1}$$

$$\frac{L_0}{RH_S}f^1(t)+\frac{f(t)}{B_0\left(1-\left(\frac{B_0}{B_S}\right)^2\right)}=\frac{-h_A}{H_0}\sin \omega t$$

$$\frac{B_S}{B_0}=\sqrt{1+\left(\frac{H_0}{H_S}\right)^2} \text{ and } B_0=\frac{B_S}{\sqrt{\left(1+\frac{H_0}{H_S}\right)^2}}$$

(10) $$\frac{L_0}{RH_S}f^1(t)+\frac{H_0}{B_SH_S}f(t)\left[1+\left(\frac{H_S}{H_0}\right)^2\right]^{3/2}=\frac{-h_A}{H_0}\sin \omega t$$

As primary interest lies in the steady-state condition of

(11) $$\frac{L_0}{R}f^1(t)+\frac{H_0}{B_S}f(t)\left[1+\left(\frac{H_S}{H_0}\right)^2\right]^{3/2}+\frac{h_AH_S}{H_0}\sin \omega t=0$$

the following equations can be established:

$$\frac{L_0}{R}=t_0;\ \frac{H_C}{B_S}\left[1+\left(\frac{H_S}{H_0}\right)^2\right]^{3/2}=a$$

$$\frac{h_AH_S}{H_0}=b$$

substituting—

$$t_0f^1(t)+af(t)=-b \sin \omega t$$

(12) $$f(t)=\left[\frac{-ab}{a^2+(\omega t_0)^2}\right]\sin \omega t+\left[\frac{\omega t_0 b}{a^2+(\omega t_0)^2}\right]\cos \omega t$$

$$=\frac{-b}{\sqrt{a^2+(\omega t_0)^2}}\sin\left(\omega t-\tan^{-1}\frac{\omega t_0}{a}\right)$$

$$B_1=\frac{B_S}{\sqrt{1+\left(\frac{H_0}{H_S}\right)^2}}+\frac{-\left(\frac{H_S}{H_0}\right)H_A\frac{B_S}{H_0}\left[H\left(\frac{H_S}{H_0}\right)^2\right]^{-3/2}}{\sqrt{1+\left(\frac{\omega t_0}{a}\right)^2}}\sin\left[\omega t-\tan^{-1}\left(\frac{\omega t_0}{a}\right)\right]$$

(13)

$$B_1=\frac{B_S}{\sqrt{1+\left(\frac{H_0}{H_S}\right)^2}}\left[1-\left[\frac{\left(\frac{H_S}{H_0}\right)}{1+\left(\frac{H_S}{H_0}\right)^2}\right]\frac{\left(\frac{H_A}{H_0}\right)}{\sqrt{1+\left(\frac{\omega t_0}{a}\right)^2}}\sin\left[\omega t-\tan^{-1}\left(\frac{\omega t_0}{a}\right)\right]\right]$$

as the quantity $$\left[\frac{\frac{H_S}{H_0}}{1+\left(\frac{H_S}{H_0}\right)^2}\right]\frac{\left(\frac{H_A}{H_0}\right)}{\sqrt{1+\left(\frac{\omega t_0}{a}\right)^2}}\ll 1$$

the above analysis appears to be justified.

Letting $$\frac{H_S}{H_0}=x-\frac{dB_1}{dt}=\omega B_S\left(\frac{H_A}{H_0}\right)\frac{x^2}{(1+x^2)^{3/2}}\frac{1}{\sqrt{1+\left(\frac{\omega t_0}{a}\right)^2}}\cos\left[\omega t-\tan^{-1}\left(\frac{\omega t_0}{a}\right)\right]$$

substituting in Equation 3 and solving for V:

(14)

$$V=10^{-8}N_LA\omega B_S\frac{H_A}{H_0}\frac{x^2}{(1+x^2)^{3/2}}\frac{1}{\sqrt{\left(H\frac{\omega t_0}{a}\right)^2}}\cos\left[\omega t-\tan^{-1}\left(\frac{\omega t_0}{a}\right)\right]$$

Referring to the equivalent circuit of FIGURE 8B it will be seen that the voltage across the terminals T is $$V_T=\left[10^{-8}N_LA\omega B_S\frac{H_A}{H_0}\frac{x^2}{(1+x^2)^{3/2}}\right]\cos \omega t$$

and $V_R$ appearing across R corresponds to Equation 14. In FIGURE 7B the "source" impedance is assumed to be a pure inductance, the "source voltage" being some fraction $\phi$ of the quantity $10^{-8}N_LA(H_A \sin \omega t)$, the electromotive force induced in $N_L$ of FIGURE 7A if the radio frequency component of the magnetizing force is assumed to link the coil $N_L$ through the entire area A. The fraction or portion $\phi$ is generally greater than 1 and may be expressed:

$$\phi=\left[\frac{B_S}{H_0}\frac{x^2}{(1+x^2)^{3/2}}\right]$$

If one desires, $\phi$ may be considered as an "imaginary" permeability which determines the extent of coupling of radio frequency flux, produced by the oscillation of $B_S$ through angle $\theta$ in FIGURE 1A, with the output coil N of FIGURE 7A. $\phi$ has the dimensions of permeability, $BlH^{-1}A^{-1}$.

It will be seen that for no signal input conditions or $H$ sig.=0; $x=0$, and $\phi$ becomes a maximum at $x=\sqrt{2}$.

$$\phi=\left[\frac{2}{9}\sqrt{3}\frac{B_s}{H_0}\right]$$

The actual magnitude of the output voltage will not occur exactly at $x=1.414$, because the source inductance $L_0/a$ is a function of $x$.

$$(15)\qquad |V|=\left[\frac{\left(10^{-8}N_L A\omega B_s\frac{H_A}{H_0}\right)x^2}{\sqrt{(1+x^2)^3+\left(\frac{\omega L_0}{R}\frac{B_s}{H_0}\right)^2}}\right]$$

Neglecting any phase shift which may occur between the applied radio frequency $$\frac{dH}{dt}$$

and the actual output across R in FIGURE 7A, the output can be regarded as due directly to the pickup in $N_L$ across area A of the radio frequency flux component of the peak magnitude $H_A$ in that figure, increased by a permeability factor $$\left(\frac{B_S}{H_0}\right)$$

and multiplied by a diminishing factor dependent upon $x$ as shown in the equation just above.

If $$\left(\frac{\omega L_0}{R}\frac{B_S}{H_0}\right)=Q$$

the ratio of the effective source reactance to the load resistance, the magnitude of output voltage across R depends directly upon $y$, where $$y=\frac{x^2}{\sqrt{Q^2+(1+x^2)^3}}$$

which depends upon $x$. $y$ reaches a maximum value when $$[(1+x^2)^3-3(1+x^2)^2]=2Q^2$$

Letting $(1+x^2)=Z$ and substituting.

$$(Z-1)^3-3(Z-1)-2(HQ^2)=0$$

Let $\mu=x^2=Z-1$ then the equation $$\mu^3-3\mu-2(1+Q^2)=0$$

gives the condition for $y$ maximum. A plot of $y$ against $x$ for values of Q ranging from 0.25 to 4, on upper limit is found for $y$ as 0.385 which occurs for $Q=0$ and $x=1.414$. From Equation 15, and substituting $y$ for $x$, $$|V|=10^{-8}N_L A\omega B_S\frac{H_A}{H_0}y$$

assuming the output to be in the form of pure radio frequency the power output can be expressed:

$$(16)\qquad P=\frac{1|V|^2}{2R}\left[\frac{\left(10^{-8}N_L A\omega B_S\frac{H_A}{H_0}y\right)^2}{2R}\right]$$

The power input $p$, required to maintain the signal current $$I_S=\frac{10lH_S}{4\pi N_S}$$

may be expressed:

$$p=R_S\left(\frac{10lH_S}{4\pi N_S}\right)^2$$

where $R_S$ is the resistance of the signal circuit.

The approximate signal circuit time constant can be taken as $L_S/R_S$, where $L_S$ is the average inductance presented to the signal circuit by coil $N_S$ of FIGURE 7A. This inductance is dependent upon the value of signal current and an average is accordingly taken. The effective permeability presented by the core to coil $N_S$ may be stated simply at $db_0/dH_S$. Averaging over $H_S$, the differential expression may be replaced by $\Delta B_0/\Delta H_S$ which is essentially $B_0/H_S$ for any operation which begins with $B_0$ and $H_S$ each equal to zero.

One can equate:

$$L_S=\left[\frac{4\pi}{10^3}\frac{N_S^2A}{l}\frac{B_0}{H_S}\right]\mu H$$

$$t_S=\left[\frac{4\pi}{10^3}\frac{N_S^2A}{l}\frac{B_0}{H_S}\frac{1}{R_S}\right]$$

in $\mu$ seconds.

Power gain $$G=P/p=\left[\frac{1}{2RR_S}\left(\frac{4\pi N_S}{10lH_S}\right)^2\left(10^{-8}N_L A\omega B_S\frac{H_A}{H_0}y\right)^2\right]$$

substituting, $$G/t_S=\left[\frac{10^3lH_SR_S}{4\pi N_S^2AB_0}\frac{1}{2RR_S}\left(\frac{4\pi N_S}{10lH_S}\right)^2\left(10^{-8}N_L A\omega B_S\frac{H_A}{H_0}y\right)^2\right]$$

$$=\pi f_{mc}Q\left(\frac{y}{x}\right)^2\sqrt{Hx^2}\left(\frac{H_A}{H_0}\right)^2$$

where $f_{mc}$ is the radio carrier frequency, $$(17)\qquad G/t_S=\pi f_{mc}\left(\frac{H_A}{H_0}\right)^2\left[\frac{Qx^2\sqrt{1+x^2}}{Q^2+(1+x^2)^3}\right]$$

This power-gain-bandwidth quantity increases directly with the auxiliary carrier frequency, as a square of the ratio between the peak value of the radio frequency magnetizing forces and the direct current bias magnetizing force which is termed the ripple ratio. The figure $G/ts$ depends upon Z where $$Z=\left[\frac{Qx^2\sqrt{1+x^2}}{Q^2+(1+x^2)^3}\right]$$

Z may be maximized by setting $Q=(1+x^2)^{3/2}$, making $$Z=\frac{x^2}{Z(1+x^2)}$$

Plotting Z against $x$ and Q, empirical values for Z show no great variation and a mean value of 0.238 may be selected so that $Z\pi=0.75$ as a rough approximation.

$$\frac{G}{t_S}=\frac{3}{4}f_{mc}\left(\frac{H_A}{H_0}\right)^2$$

It will be seen that in order to operate at high information pulse rates required in digital computers, the highest practicable carrier frequency must be used. At frequencies around 50 mc., which is of the order of magnitude required, it is probably that transistors of the welded germanium diode type would be required in the detecting circuit. Therefore, the above amplifiers both necessitate and permit the use of low power operation. The output power level can be obtained from Equation 16, as follows:

$$P=\left[\frac{10^{-16}N_L^2A^2\omega^2B_S^2\left(\frac{H_A}{H_0}\right)^2y^2}{2R}\right]$$

as $$Q=\frac{\omega L_0}{R}\frac{B_S}{H_0}\text{ and }\frac{1}{2R}=\frac{QH_0}{Z\omega L_0B_S}$$

$$P=\frac{10^{-16}NL^2A^2\omega^2B_S^2\left(\frac{H_A}{H_0}\right)^2y^2QH_0}{2\omega L_0B_S}$$

$$=\left[\frac{10^{-16}NL^2A^2\omega B_S\left(\frac{H_A}{H_0}\right)^2y^2QH_0}{\frac{8\pi}{10^9}\frac{NL^2A}{l}}\right]$$

$$=\left[\frac{10^{-7}}{8\pi}Al\omega B_SH_0Qy^2\left(\frac{H_A}{H_0}\right)^2\right]$$

Let $Al=Vc$=volume of core as $$y^2=\frac{x^4}{Q^2+(1+x^2)^3}$$

$$(18)\quad P=\left[\frac{10^{-7}}{8\pi}V_c\omega H_0B_S\left(\frac{H_A}{H_0}\right)^2\right]\left[\frac{Qx^4}{Q^2+(1+x^2)^3}\right]$$

Evaluating with constants of a core actually built and tested in which:

$Vc=0.04$ cm.$^3$
$f=50$ mc.
$B_S=2000$ gauss
$H_0=20$ oersteds $$\frac{H_A}{H_0}=0.70$$

$Q=2$
$x=1.5$

A value for P of 270 watts is obtained. This value is about one hundred times larger than is required for computer work. The transverse type magnetic amplifier therefor has ample reserve power capabilities for digital computer work.

It will be understood that just as the D.C. bias and the R.F. ripple can be combined in a single winding, so also can the R.F. ripple be superimposed, in theory at least, upon the signal pulse. While not a preferred arrangement, an inspection of FIGURE 1A would indicate that vector $B_S$ would oscillate quite as well if field vector $H_{A_1}$ varied in magnitude as it does with the variation of $H_A$ between the limits $H_B$ and $H_C$.

Other circuits and systems incorporating features of this invention are described in applicant's issued Patents 2,921,251, issued on January 12, 1960, 2,888,637, issued on May 26, 1959, 2,814,733, issued on November 26, 1957, and 2,811,652, issued on October 29, 1957, and copending application Serial Number 494,946, all filed concurrently herewith.

While there have been described above what are now believed to be preferred forms of the invention, the appended claims are intended to include all variations thereof which fall within the true spirit of the invention.

I claim:

1. In a transverse magnetic amplifier, the combination of a core of saturable magnetic material having a channel therethrough, a first winding threading said channel, a second winding threading said channel, a third winding wound around said core orthogonal to said first and said second windings, a fourth winding wound around said core orthogonal to said first winding, means for applying an input current to a first, input one of said windings, a continuous bias current to a second, bias one of said windings, and a power current to a third, power one of said windings with the net magnetizing force produced thereby being sufficient to maintain said core in saturation throughout the operation, and means for deriving output signals from the remaining one of said four windings in accordance with said input and power currents.

2. A magnetic device comprising a saturable magnetic element, a plurality of winding means respectively linked to said element in transverse directions of magnetization, means for energizing at least a part of each of said winding means simultaneously and at least one of said parts linked in a first one of said directions in a varying amount and at least one of said parts with a bias to saturate said element in one of opposite directions of magnetization with the net magnetizing force produced by said winding means when energized being sufficient to drive said element to substantial saturation in said one direction throughout the operation whereby the saturated magnetization vector of said element changes direction in response to direction changes of said net magnetizing force to produce an effective mutual inductance between said transverse winding means, and means for deriving output signals from that one of said winding means that is linked in a direction transverse to said first direction.

3. In combination, a transverse magnetic amplifier comprising a magnetic core, a bias winding, means for energizing said bias winding to produce a saturating bias field which carries the core material into the region of effective clamping action between the resultant saturating magnetizing field and the saturated magnetic flux and into the region of vanishing hysteresis loss, said bias winding linking said core along a first axis, an alternating current winding linking said core along said first axis, means for energizing said alternating current winding with alternating current for superimposing an alternating field on said bias field to produce a variation in the amplitude of the resulting magnetizing field within said region of effective clamping action, winding means linking said core along a second, transverse axis, a circuit connected to said second axis winding means and having signal input terminals, and means including an output terminal for deriving a modulated frequency output, and means connected to said input terminals for applying thereto input signals causing changes in direction of the resultant saturating magnetizing field and the saturated magnetic flux clamped together, whereby output signals are produced with negligible hysteresis loss and in accordance with modulations of said alternating current by said input signals.

4. In combination, a transverse magnetic amplifier having a ferro-magnetic core, a direct current bias winding for producing a field which carries the material of said core into the region of effective clamping action between the resultant supersaturating magnetizing field and the fully saturated magnetic flux and into the region of vanishing hysteresis loss, said D.C. bias winding threading the core material, a radio frequency winding threading said core material for superimposing a radio frequency field on the said field produced by the D.C. bias winding to produce a variation in the amplitude of the resulting magnetizing field, a winding surrounding said core material, a circuit connected to said surrounding winding and having signal input terminals, and an output terminal for modulated frequency output, said circuit being constructed to receive input signals causing movement of the resultant supersaturating magnetizing field and the fully saturated magnetic flux clamped together, whereby output signals are produced with negligible hysteresis loss, said circuit having a radio frequency choke coil connected to one side of said winding surrounding said core and to one of said input terminals.

5. In combination, a transverse magnetic amplifier comprising a cylindrical ferromagnetic core, a D.C. bias winding for producing a magnetizing field which carries the core material into the region of effective clamping action between the resultant supersaturating magnetizing field and the fully saturated magnetic flux and into the region of vanishing hysteresis loss, said D.C. bias winding threading the core material, a radio frequency winding threading said core material for superimposing a radio frequency field on the said field produced by the D.C. bias winding to produce a variation in the amplitude of the resulting magnetizing field, a winding surrounding said core material, a circuit connected to said surrounding winding and having signal input terminals, and an output terminal for modulated frequency output, said circuit being constructed to receive input signals causing movement of the resultant supersaturating magnetizing field and the fully saturated magnetic flux clamped together, whereby output signals are produced with negligible hysteresis loss, said circuit having a radio frequency choke coil connected to one side of said winding surrounding said core and to one of said input terminals, and a radio frequency condenser connected to said coil and to one of said input terminals, said choke coil and said condenser cooperating to inhibit coupling back of radio frequency waves from the winding surrounding said core.

6. In combination, a transverse magnetic amplifier comprising a cylindrical ferromagnetic core, a D.C. bias winding for producing field which carries the core material into the region of effective clamping action between the resultant supersaturating magnetizing field and the fully saturated magnetic flux and into the region of vanishing hysteresis loss, said D.C. bias winding threading the core material, a radio frequency winding threading said core material for superimposing a radio frequency field on the said field produced by the D.C. bias winding to produce a variation in the amplitude of the resulting magnetizing field, a winding surrounding said core material, a circuit connected to said surrounding winding and having signal input terminals, and an output terminal for modulated frequency output, and means connected to said circuit for applying to said input terminal input signals causing movement of the resultant supersaturating magnetizing field and the fully saturated magnetic flux clamped together, whereby output signals are produced with negligible hysteresis loss, said circuit having a radio frequency choke coil connected to one of said input terminals, and a radio frequency condenser connected to said coil and to one of said input terminals, said choke coil and said condenser cooperating to inhibit coupling back of radio frequency waves from the winding surrounding said core, said input signal applying means including means to apply a signal pulse to said input terminals of sufficient duration that the resulting high supersaturating magnetic field and the fully saturated magnetic flux movable therewith experience a sufficient number of oscillations to form a definite modulation envelope at the output terminal.

7. A transverse magnetic amplifier comprising an element of magnetic material, means for applying a first field to said element including a first winding means, and a first means for energizing said first winding means, means for applying a second field to said element simultaneously with said first field including a second winding means, and a second means for energizing said second winding means, said first and second winding means being linked to said element in transverse directions so that said first and second fields are non-parallel and intersect each other at an angle in said material, said first and second energizing means being arranged to supply such energizations that at least the field in one of said directions has a variable magnitude and said fields have a resultant that changes direction and that saturates said element throughout the operation and the resultant saturated magnetic flux moves and tends to follow the direction changes of the resultant of said fields whereby operation of the amplifier is in the region of small rotational hysteresis loss, and means connected to that one of said winding means linked in the other of said directions for deriving output signals in accordance with said direction changes.

References Cited in the file of this patent

UNITED STATES PATENTS

| | | |
|---|---|---|
| 1,287,982 | Hartley | Dec. 17, 1918 |
| 1,794,717 | Lindenblad | Mar. 3, 1931 |

OTHER REFERENCES

Abstract, Langsdorf, 212,266, published June 30, 1953.